(12) United States Patent
Kuroda et al.

(10) Patent No.: US 8,110,272 B2
(45) Date of Patent: Feb. 7, 2012

(54) INFORMATION RECORDING MEDIUM

(75) Inventors: Kazuo Kuroda, Saitama (JP); Eiji Muramatsu, Saitama (JP); Akira Imamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 950 days.

(21) Appl. No.: 11/917,037

(22) PCT Filed: Jun. 7, 2006

(86) PCT No.: PCT/JP2006/311446
§ 371 (c)(1),
(2), (4) Date: May 2, 2008

(87) PCT Pub. No.: WO2006/132283
PCT Pub. Date: Dec. 14, 2006

(65) Prior Publication Data
US 2009/0233036 A1    Sep. 17, 2009

(30) Foreign Application Priority Data
Jun. 9, 2005  (JP) .................. 2005-169908

(51) Int. Cl.
*B32B 3/02*  (2006.01)
(52) U.S. Cl. .................. 428/64.1; 428/64.4; 430/270.11
(58) Field of Classification Search .................. 428/64.4
See application file for complete search history.

(56) References Cited

U.S. PATENT DOCUMENTS
6,440,248 B1 *  8/2002  Mueller .................. 156/219

FOREIGN PATENT DOCUMENTS

| JP | 07-272325 A | 10/1995 |
|---|---|---|
| JP | 09-237438 A | 9/1997 |
| JP | 10-283676 A | 10/1998 |
| JP | 2000-311346 A | 11/2000 |
| JP | 2001-023237 A | 1/2001 |
| JP | 2002-123983 A | 4/2002 |
| JP | 2003-091868 A | 3/2003 |
| JP | 2004-095092 A | 3/2004 |
| JP | 2005-346886 A | 12/2005 |

OTHER PUBLICATIONS

Techjapan, BC/CD Dual Format Disc posted on Oct. 19, 2004, "http://www.techjapan.com/modules.php? op=modload &name=News&file=article&sid=604&mode=thread&order=o &thod=o".
International Search Report of PCT/JP2006/311446 filed Jun. 7, 2006, date of mailing Sep. 26, 2006.

* cited by examiner

*Primary Examiner* — Elizabeth Mulvaney
(74) *Attorney, Agent, or Firm* — Young & Thompson

(57) ABSTRACT

An information recording medium (100) is provided with at least a first recording layer (101), which accepts a first laser beam having a first wavelength, can display a visible display pattern (pit art), and has a first pit formed thereon for reading information; and a second recording layer (102), which accepts a second laser beam having a second wavelength and can record second information by forming a second pit.

13 Claims, 17 Drawing Sheets

[FIG. 1]
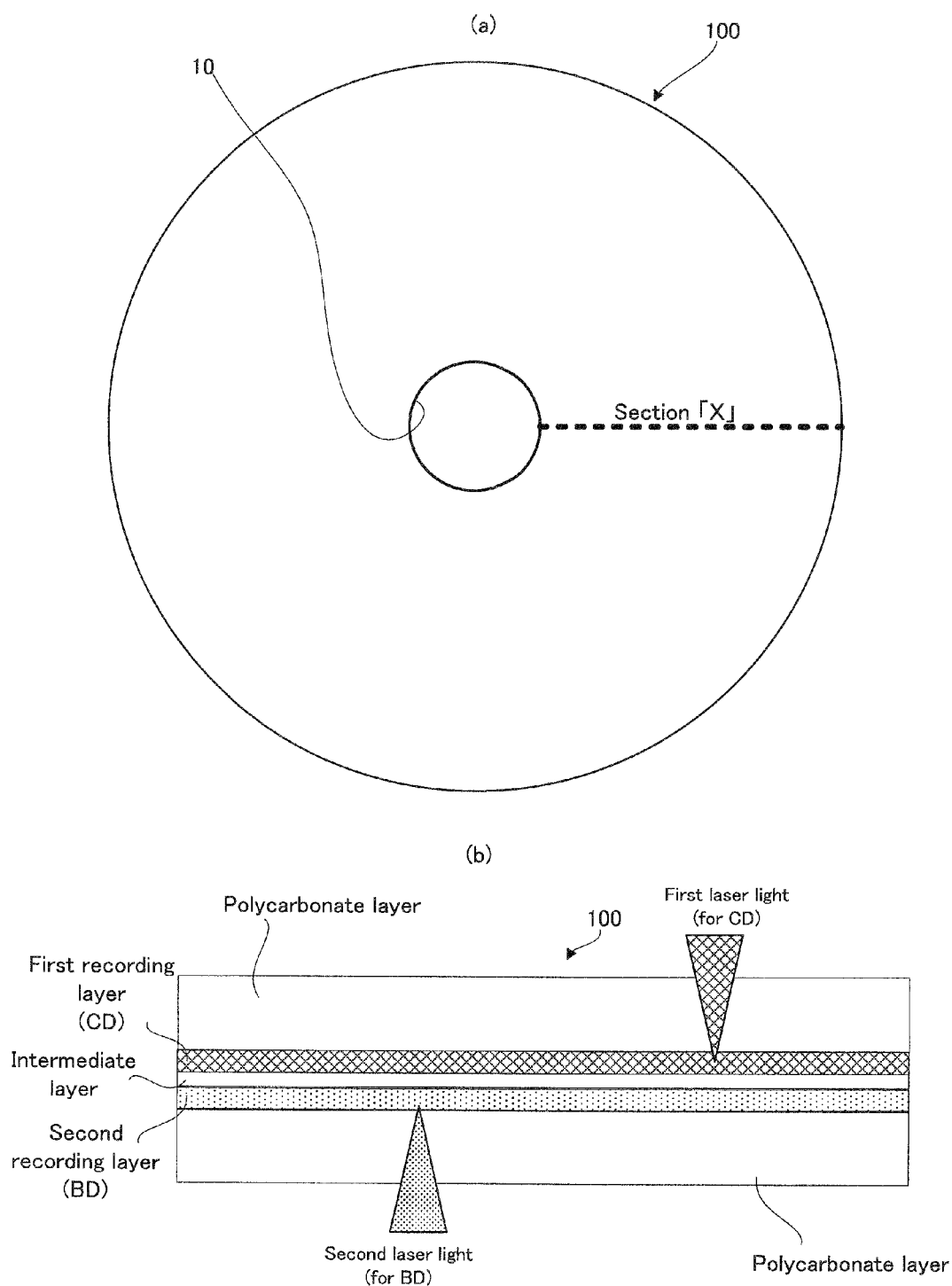

[FIG. 2]
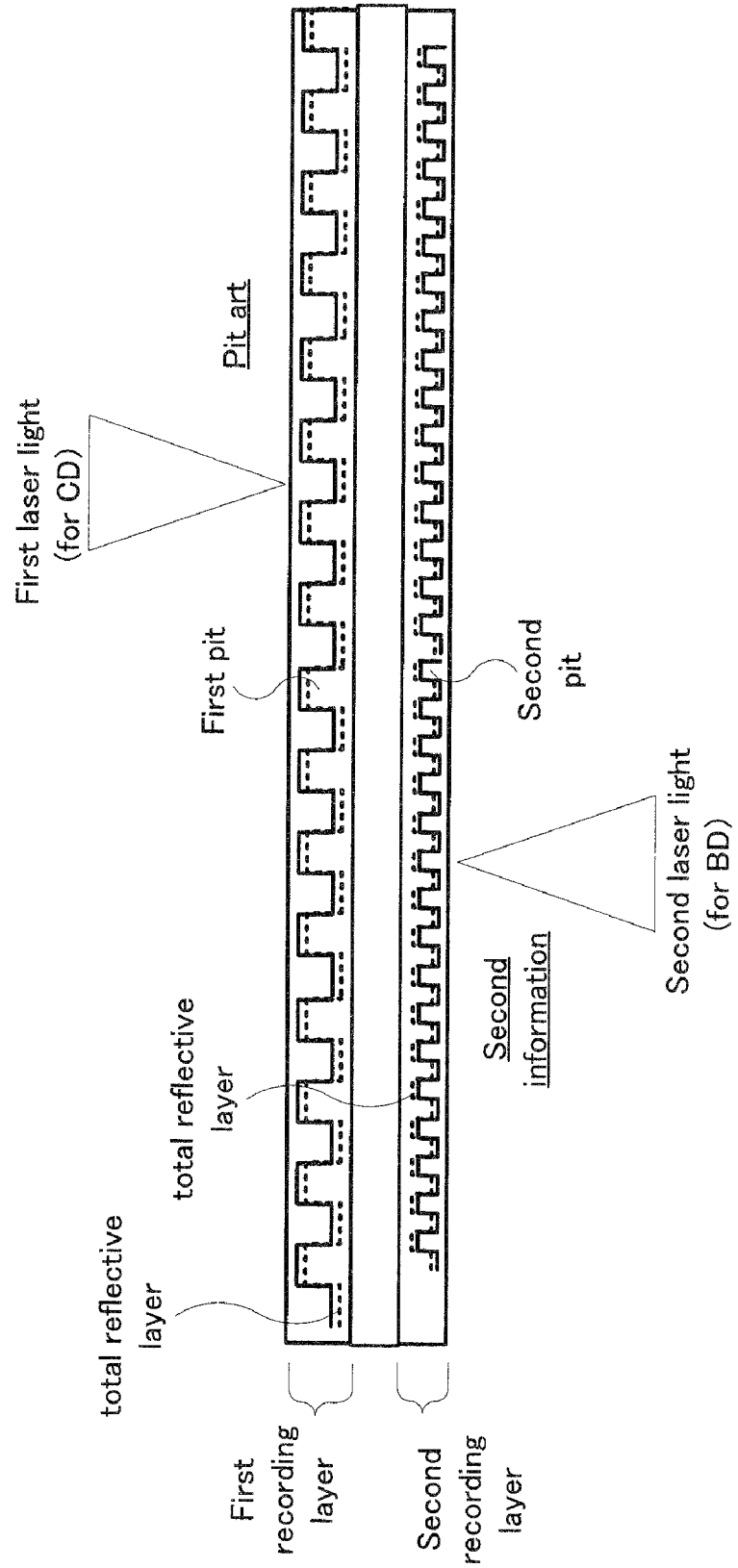

[FIG. 3]
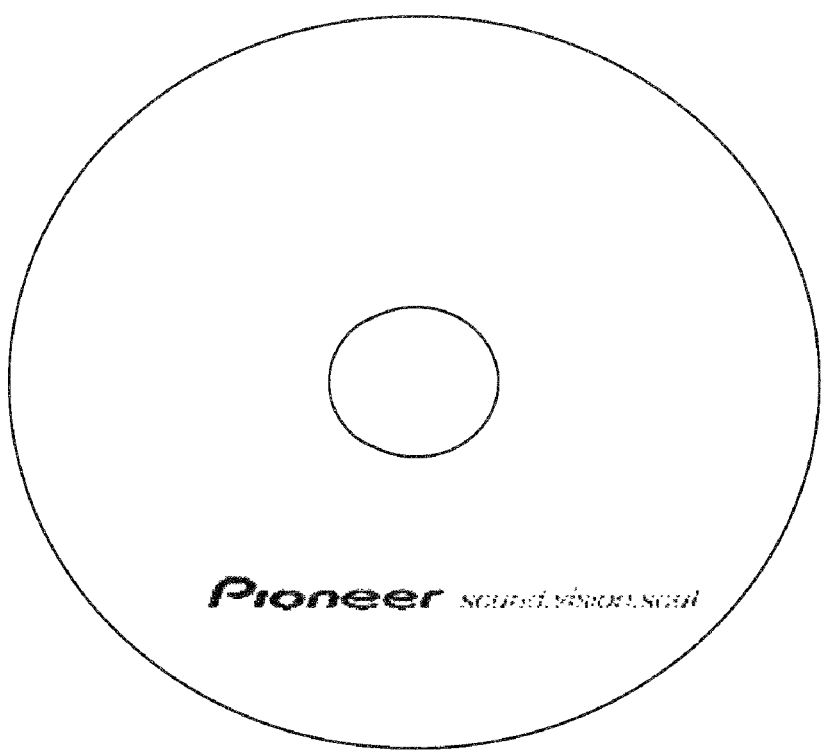

[FIG. 4]
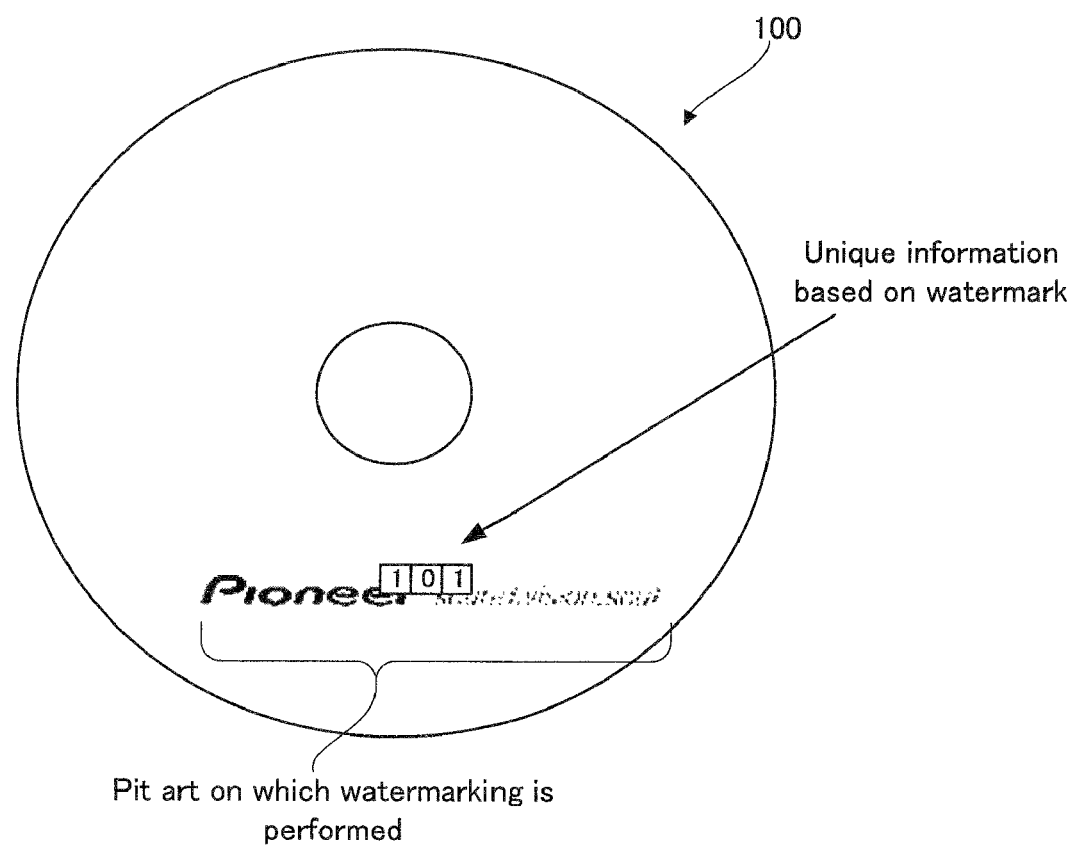

[FIG. 5]
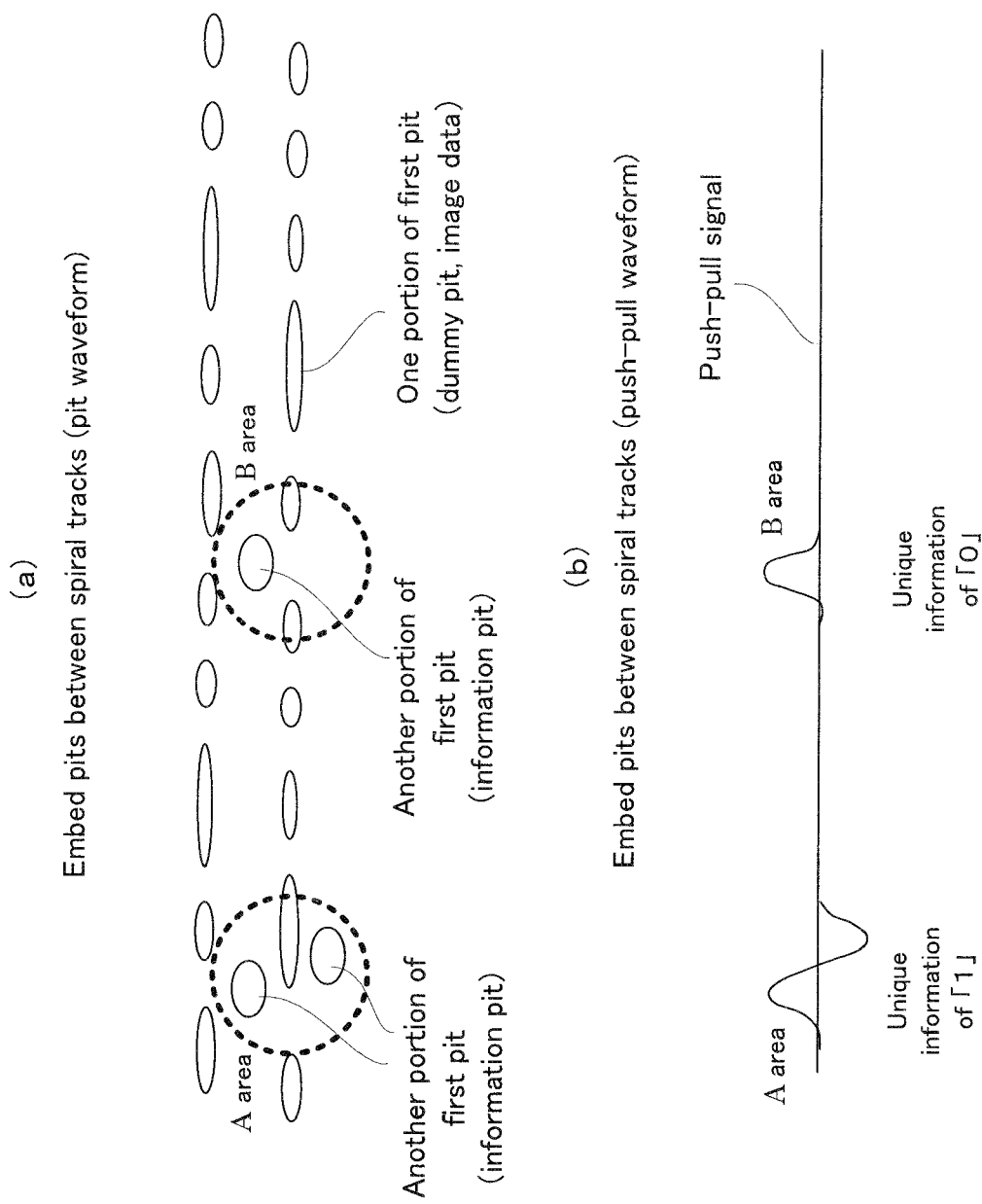

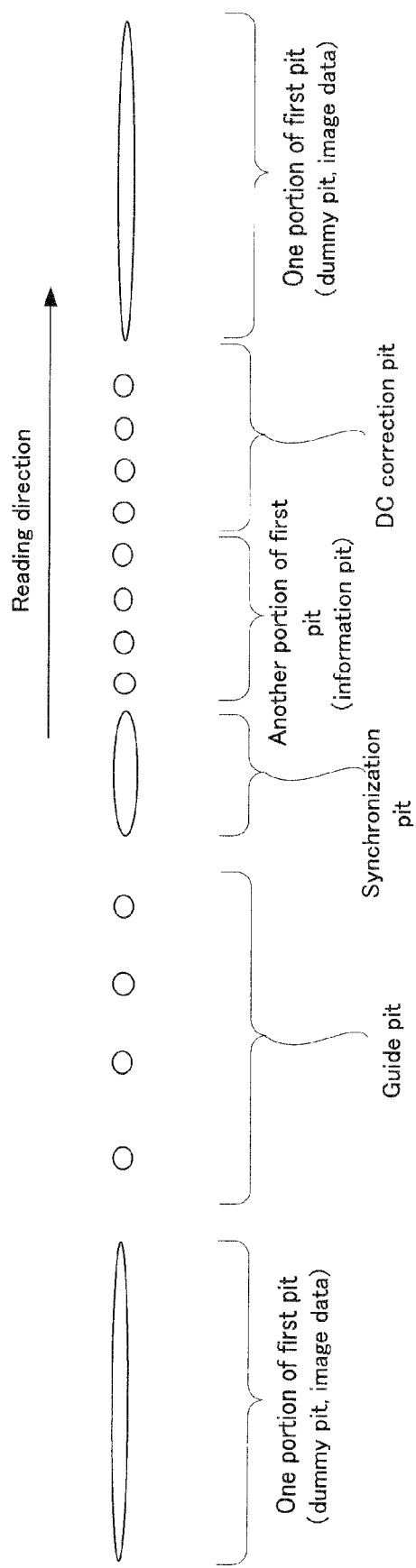
[FIG. 6]

[FIG. 7]
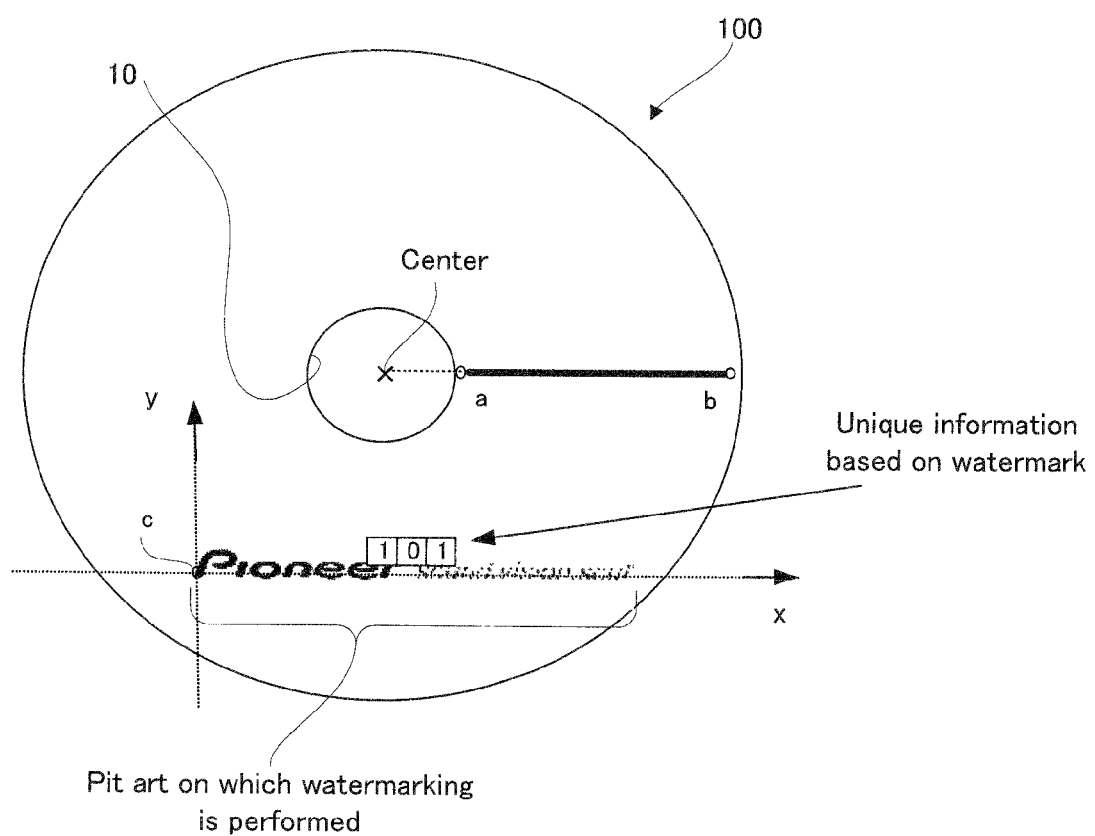

[FIG. 8]
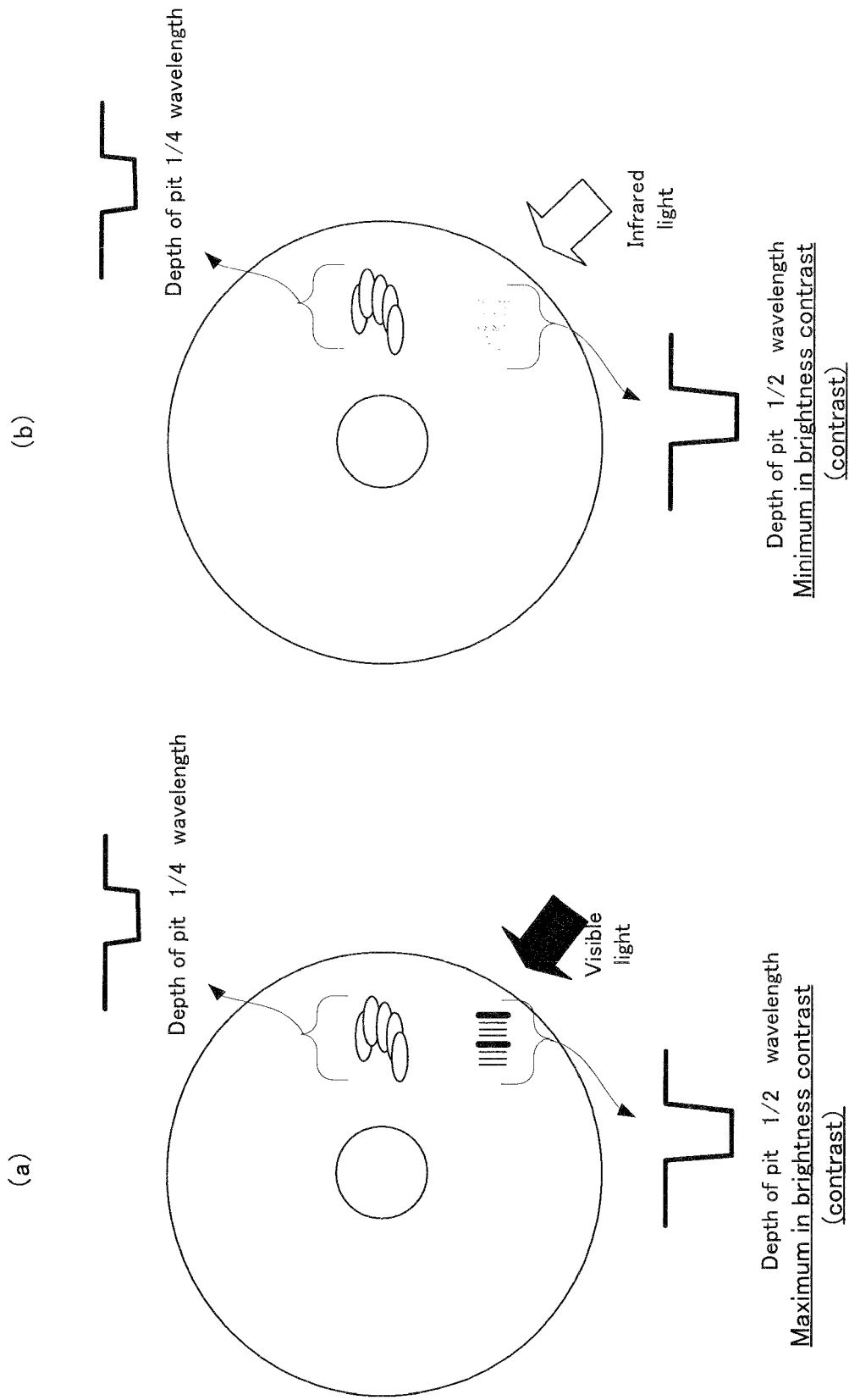

[FIG. 9]
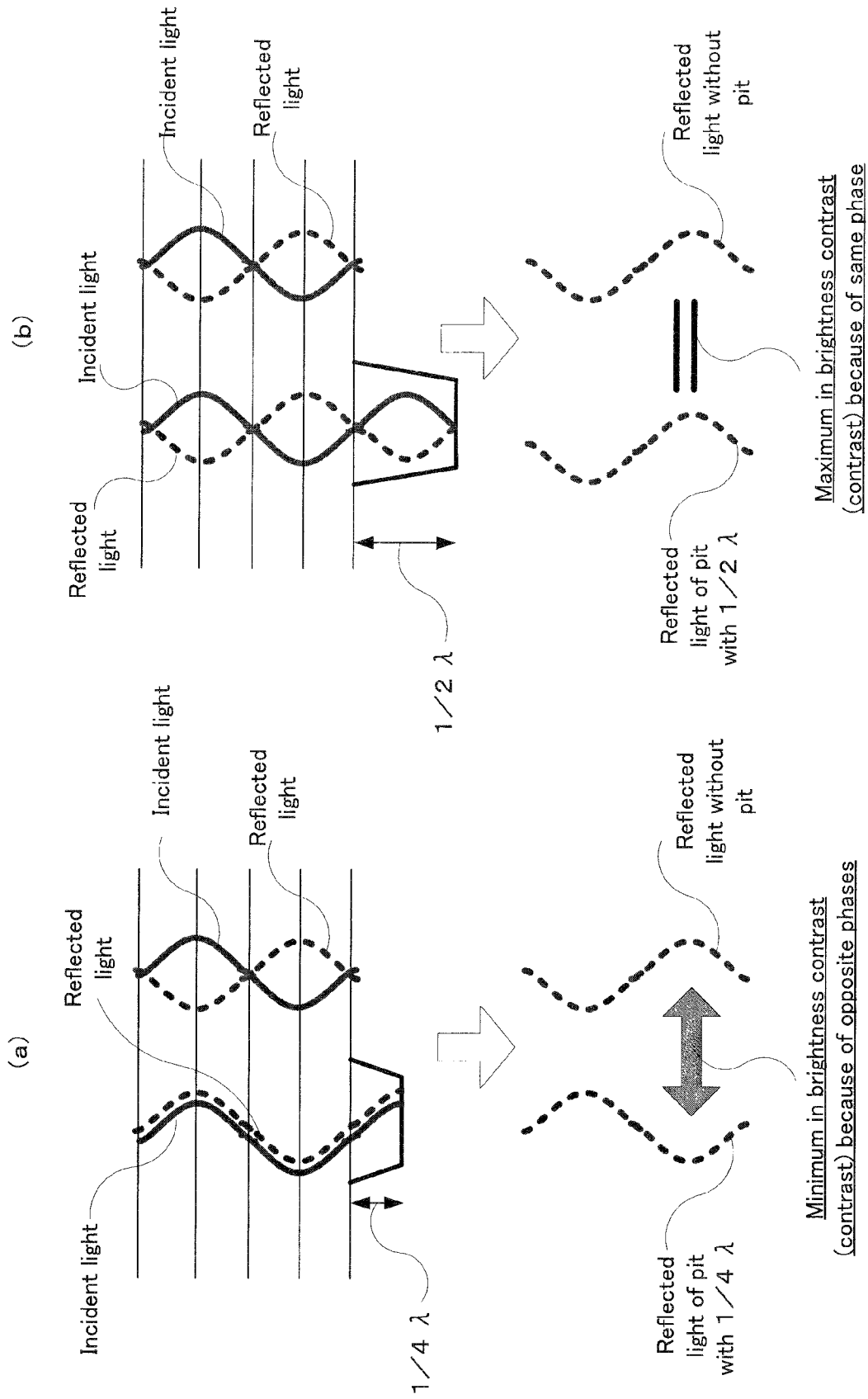

[FIG. 10]
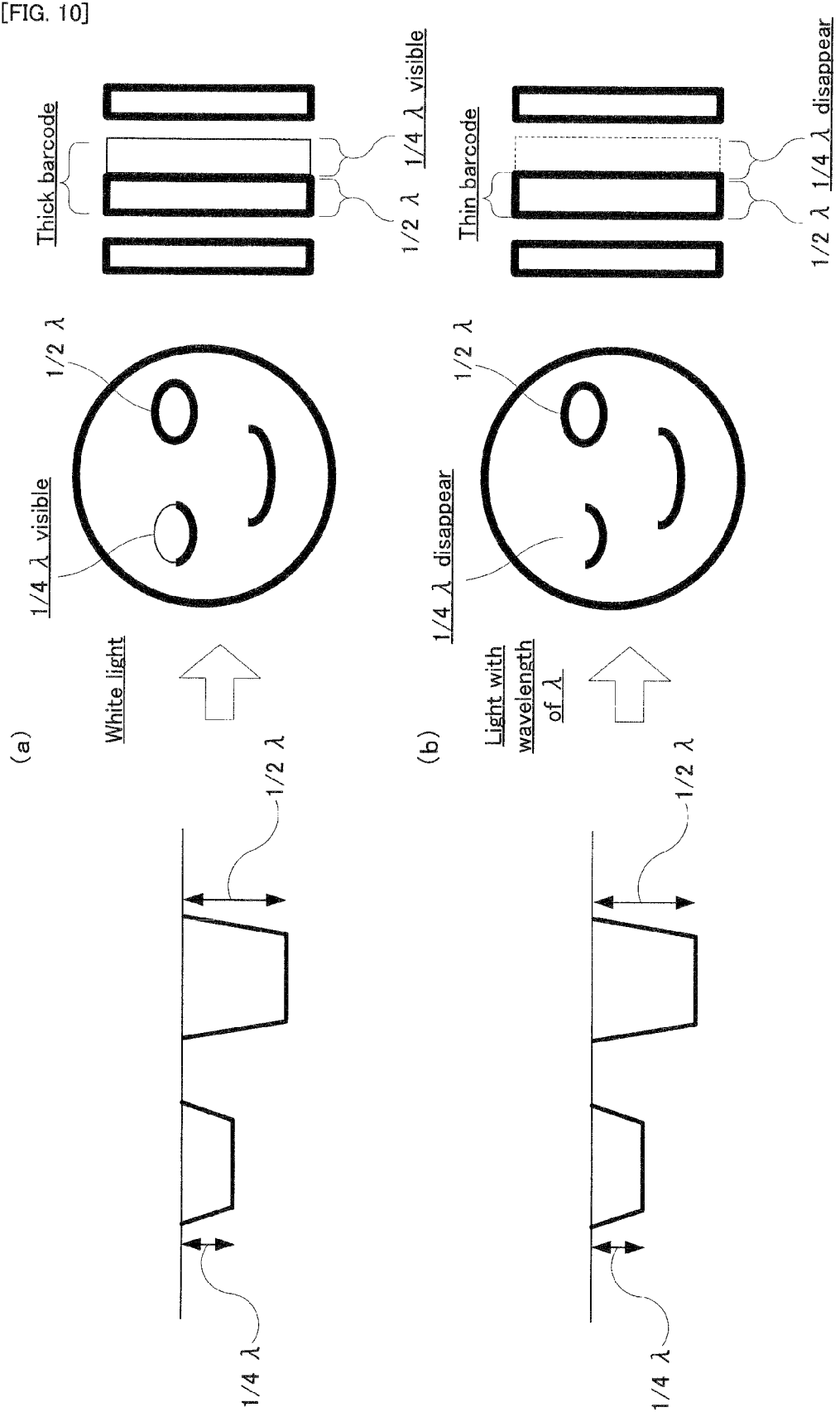

[FIG. 11]
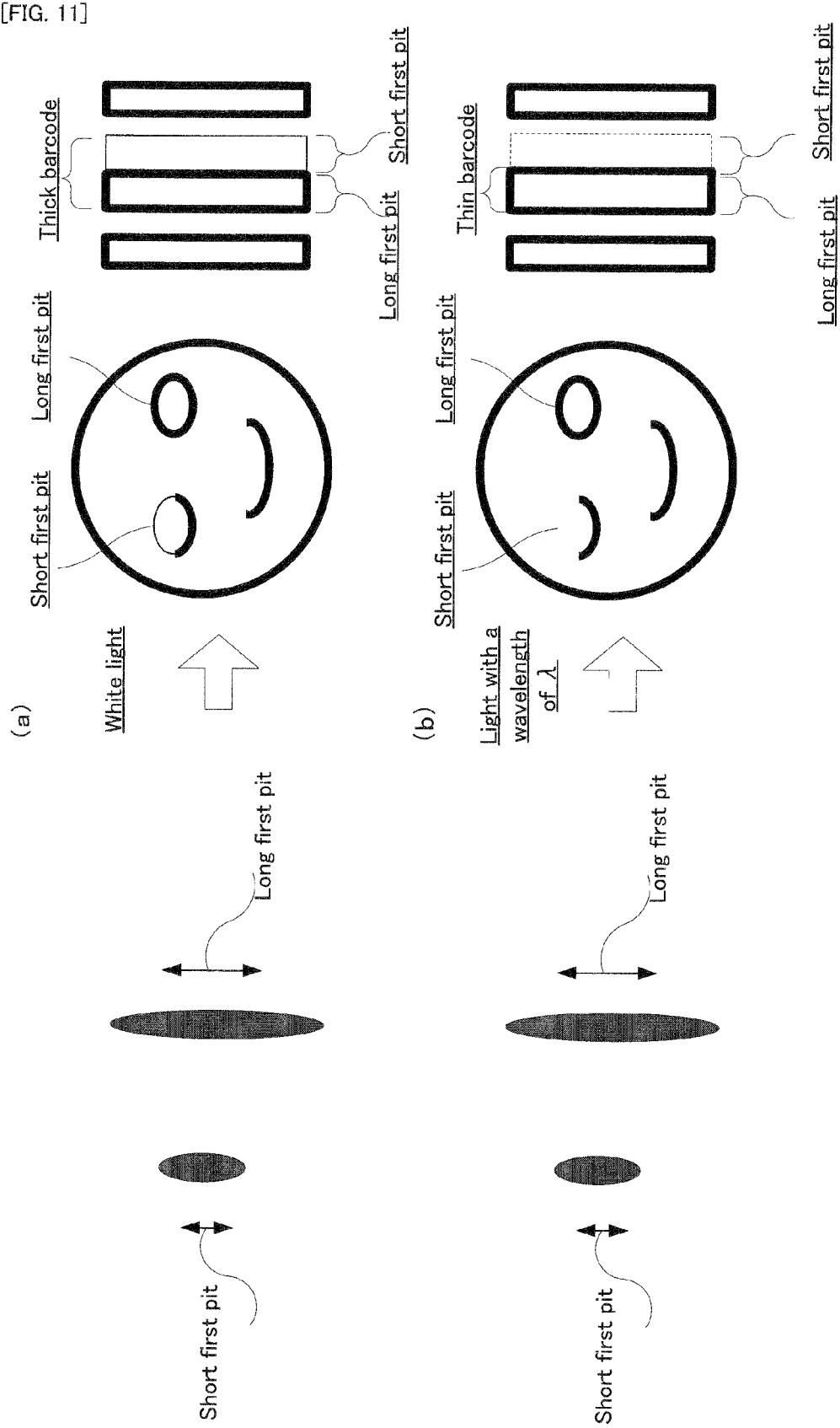

[FIG. 12]
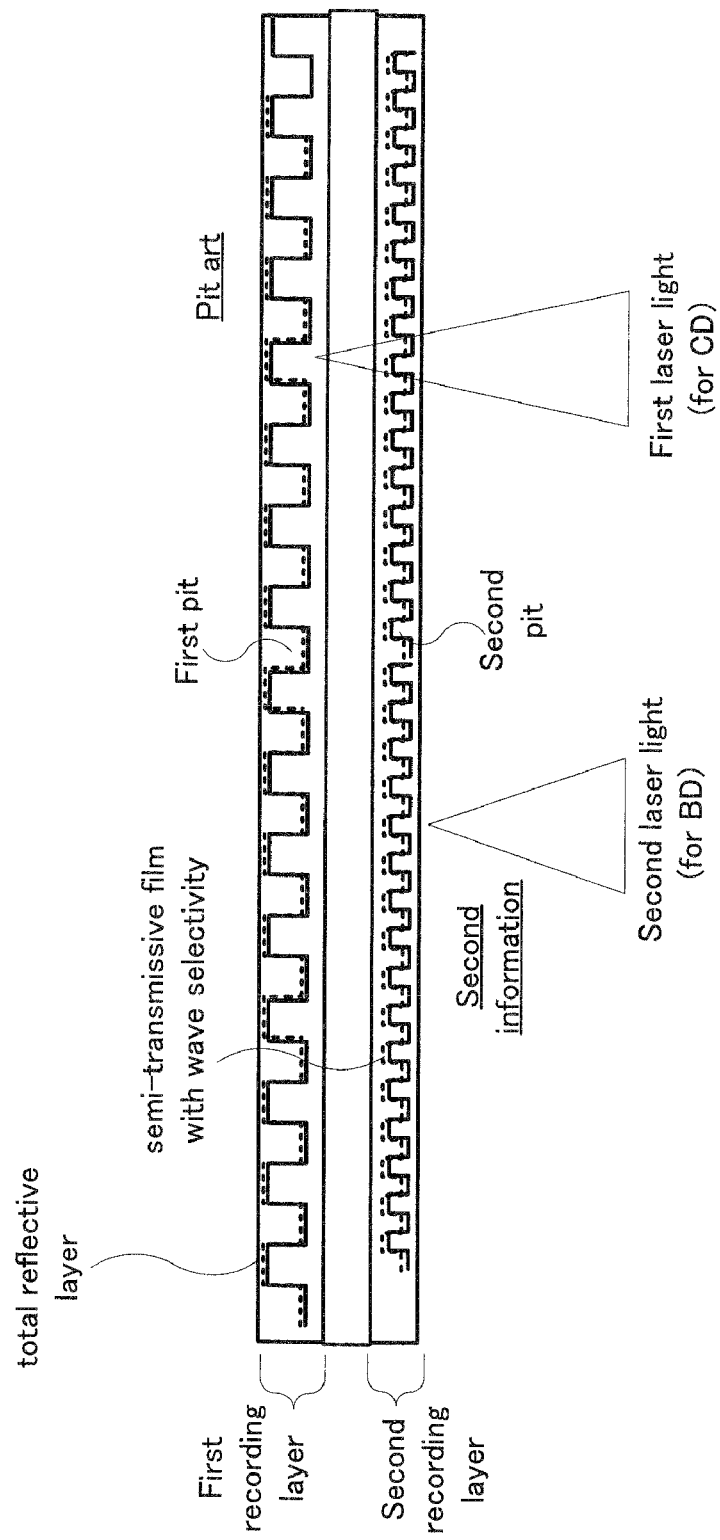

[FIG. 13]
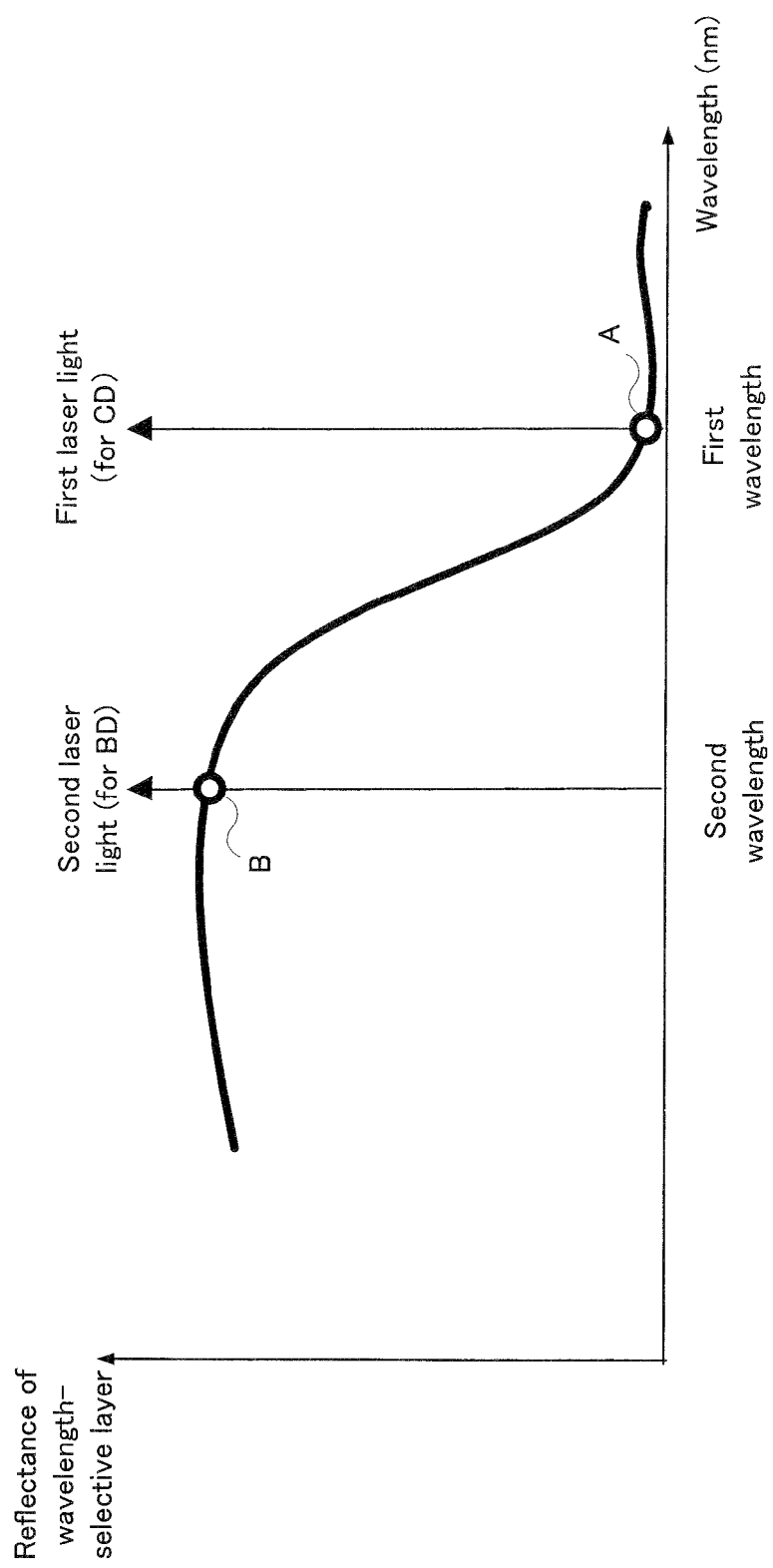

[FIG. 14]
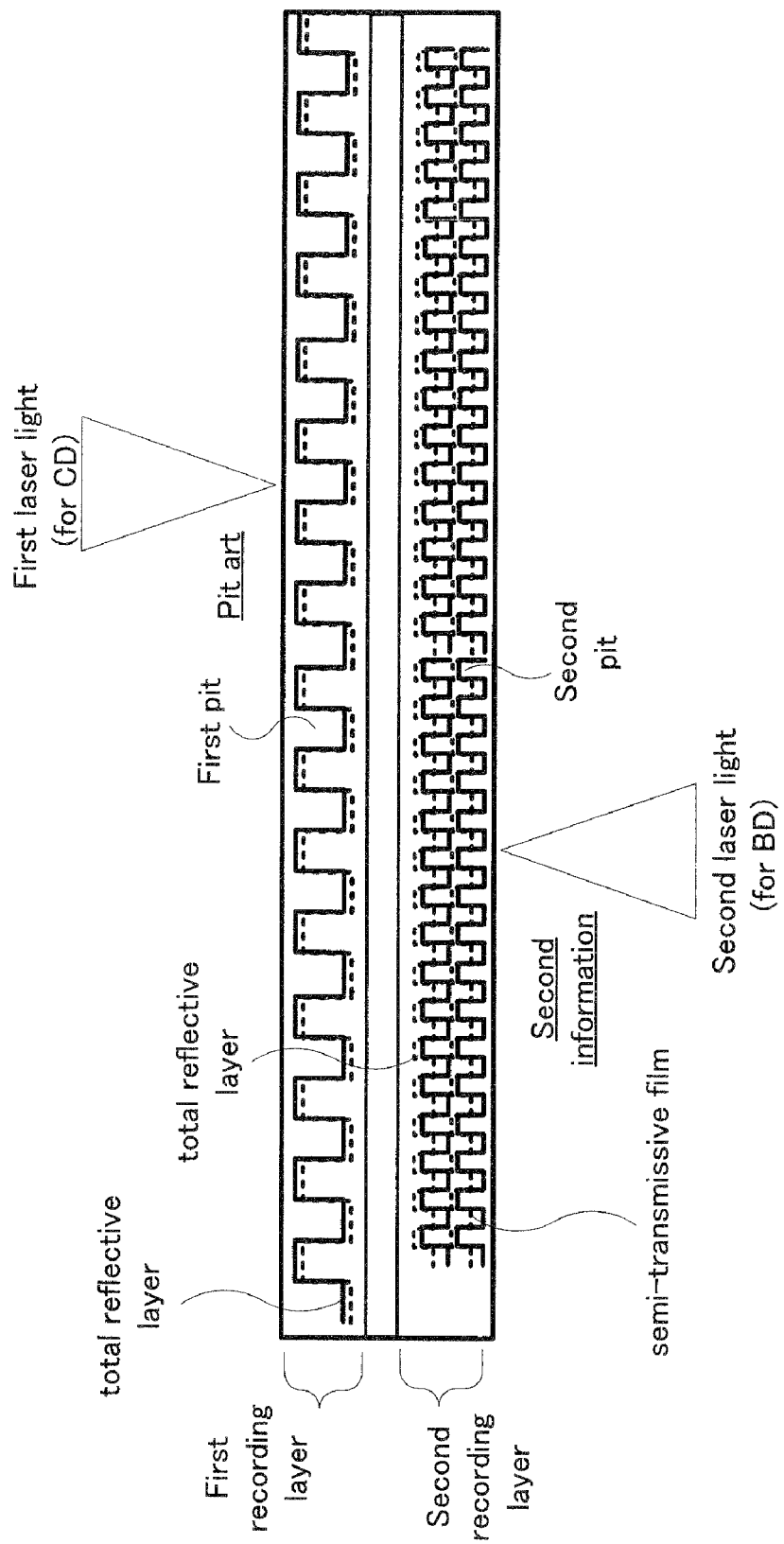

[FIG. 15]
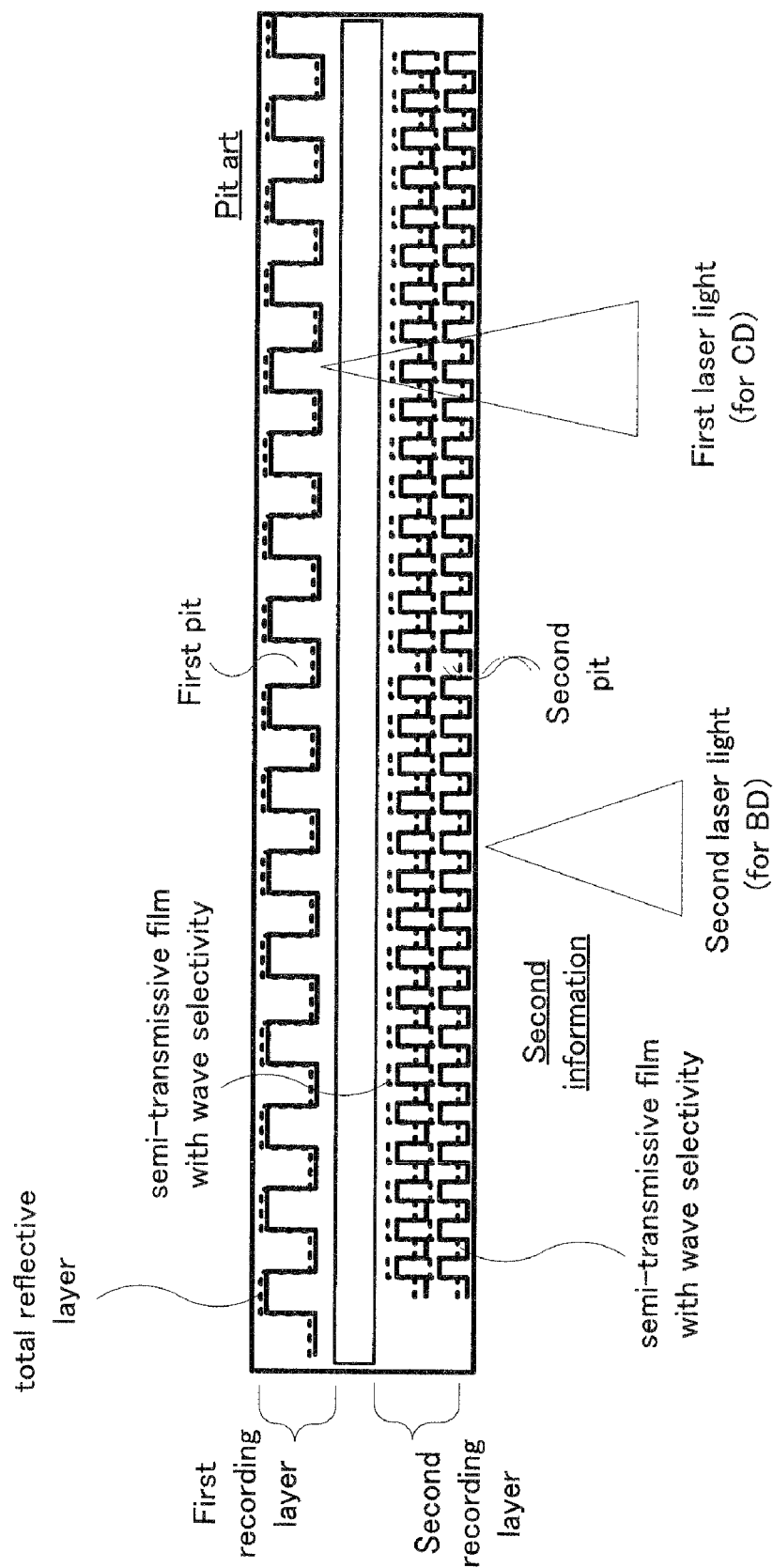

[FIG. 16]
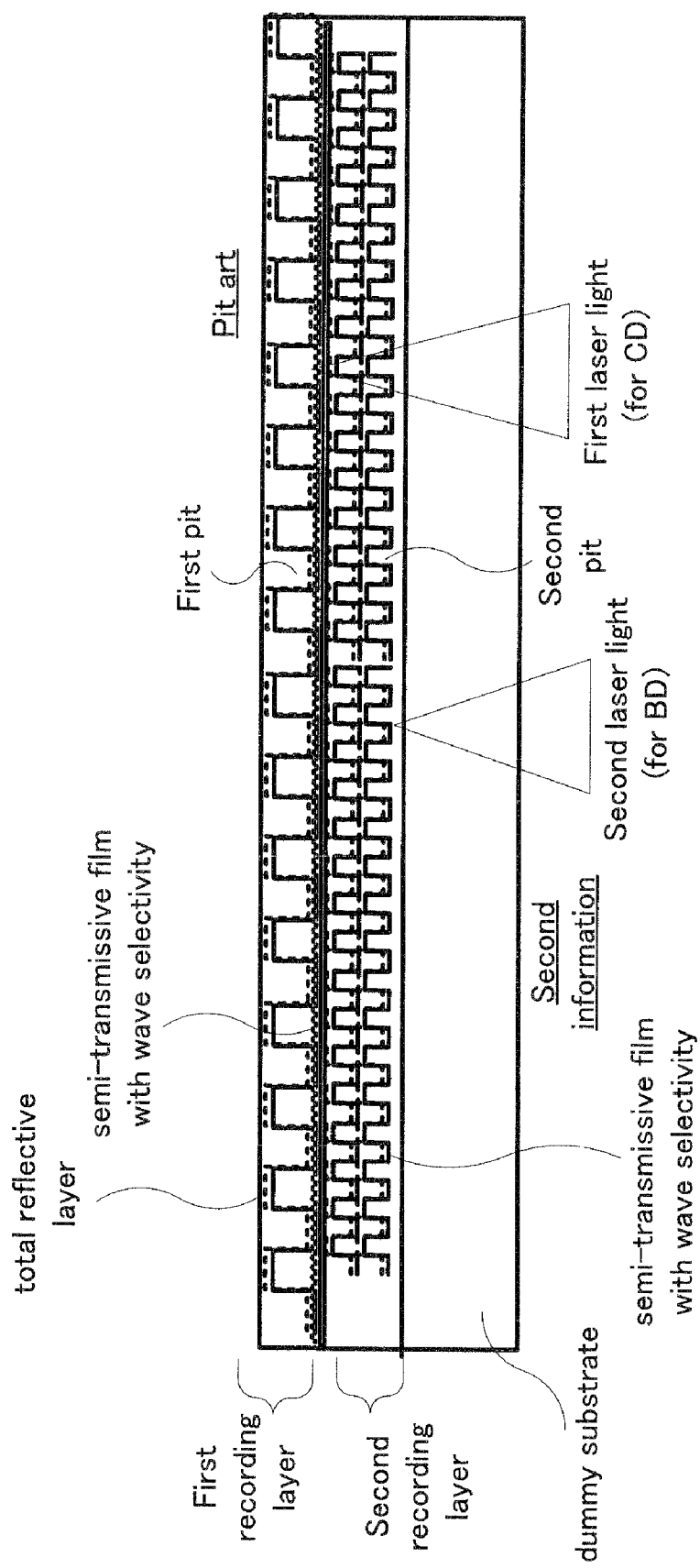

[FIG. 17]
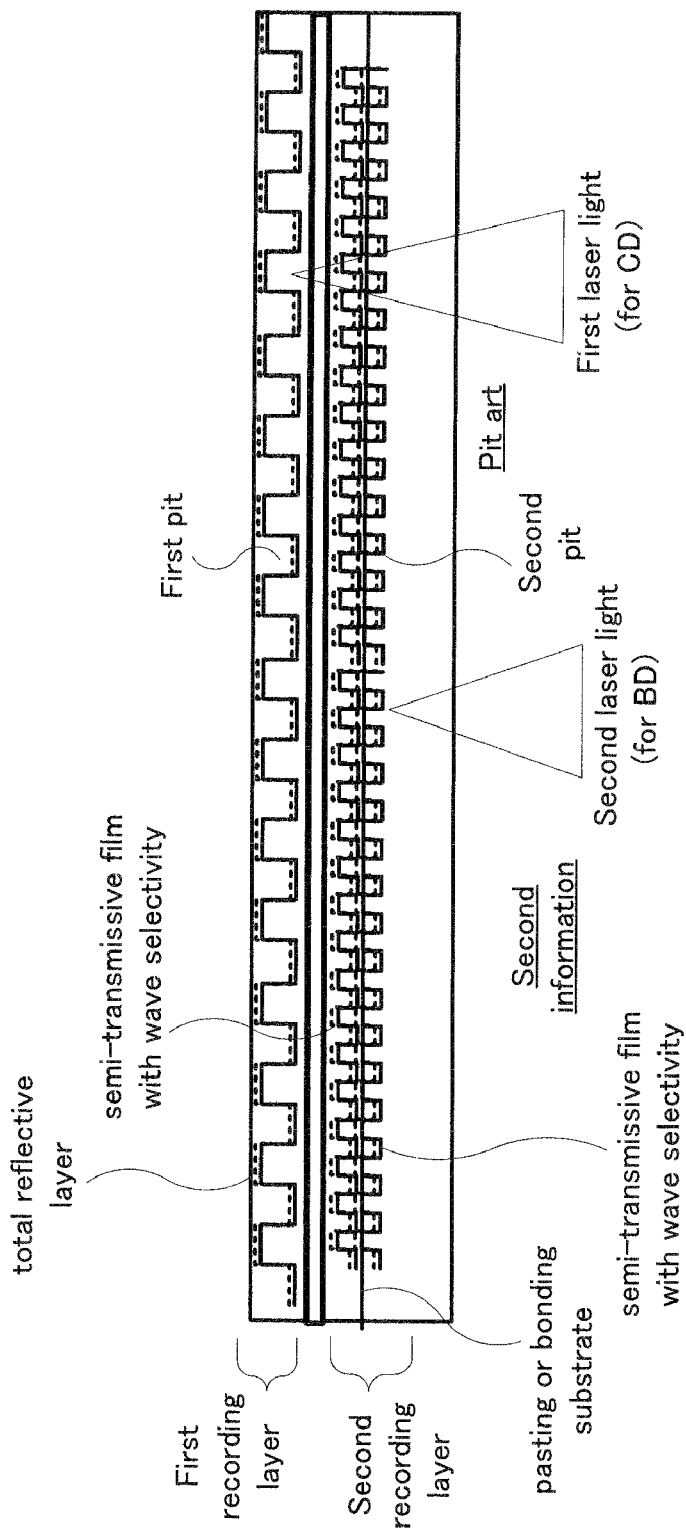

INFORMATION RECORDING MEDIUM

TECHNICAL FIELD

The present invention relates to a multilayer type information recording medium, such as a dual layer type optical disc.

BACKGROUND ART

In an information recording medium, such as, for example, a CD-ROM (Compact Disc-Read Only Memory), a CD-R (Compact Disc-Recordable), and a DVD-ROM, as described in patent documents 1 and 2 or the like, there is also developed an information recording medium, such as a multilayer type, double layer, or multiple layer type optical disc, in which a plurality of recording layers are laminated on the same substrate. More specifically, a dual layer type optical disc has, as a first layer, a first recording layer located on the front (i.e. on the closer side to an optical pickup) as viewed from the irradiation side of laser light at the time of recording by an information recording apparatus, and it further has a semi-transmissive reflective film located on the rear side thereof (i.e. on the farther side from the optical pickup). Moreover, the dual layer type optical disc has, as a second layer, a second recording layer located on the rear side of the semi-transmissive reflective film through an intermediate layer, such as an adhesive layer, and it further has a reflective film on the rear side thereof. Then, on an information recording apparatus, such as a CD recorder, for performing the recording with respect to the dual layer type optical disc, laser light for recording is focused on the first recording layer, to thereby record information into the first recording layer in an irreversible change recording method by heat or a rewritable method. Moreover, the laser light is focused on the second recording layer, to thereby record information into the second recording layer in the irreversible change recording method by heat or the rewritable method.

In particular, as disclosed in a patent document 3 or the like, there is proposed a method of inserting an intermediate layer with so-called wavelength selectivity (hereinafter referred to as a "wavelength-selective layer", as occasion demands) between two layers of the dual-layer type optical disc provided with the recording layers in each of which the recording can be performed by irradiating laser light with two different wavelengths onto one signal surface, wherein the wavelength selectivity means that a reflectance with respect to the laser light with one relatively short wavelength is relatively high and a reflectance with respect to the laser light with the other relatively high wavelength is relatively low. Therefore, both a reproducing apparatus which emits the laser light with the one wavelength and a reproducing apparatus which emits the laser light with the other wavelength can perform reproduction on the recording medium, so that it is possible to maintain reproduction compatibility.

Moreover, as disclosed in a non-patent document 1 or the like, there is also invented a recording medium, such as a dual-layer type optical disc, provided with: (i) one recording layer in which the recording can be performed by using laser light with one wavelength, irradiated on one signal surface of the optical disc; and (ii) another recording layer in which the recording can be performed by using laser light with another wavelength, irradiated on another signal surface of the optical disc.

On the other hand, as disclosed in a patent document 6 or the like, there is also invented an optical disc which can display a so-called pit art, which is a display pattern that can be visually recognized, such as an image and a character or text, by forming a dummy pit along a spiral track on a label surface, for example.

Patent document 1: Japanese Patent Application Laid Open NO. 2000-311346

Patent document 2: Japanese Patent Application Laid Open NO. 2001-23237

Patent document 3: Japanese Patent Application Laid Open NO. Hei 9-237438

Patent document 4: Japanese Patent Application Laid Open NO. 2004-95092

Patent document 5: Japanese Patent Application Laid Open NO. 2003-91868

Patent document 6: Japanese Patent Application Laid Open NO. Hei 10-283676

Non-Patent document 1: [online] "Enter the Blu-Ray Disc and CD Integrated Disc", the Internet <URL:http://nikkeibp.jp/wcs/leaf/CID/onair/jp/elec/337888>

DISCLOSURE OF INVENTION

Subject to be Solved by the Invention

However, there is such a technical problem that even if the dummy pit is formed on the aforementioned multilayer type optical disc with the plurality of recording layers in order to display the display pattern (or pit art), it is hardly possible or completely impossible to record various information in parallel with a function for displaying the display pattern, such as an image, on the dummy pit. Specifically, there is such a technical problem that it is impossible to record unique information to achieve copyright protection about the display pattern that can be displayed on the optical disc.

In view of the aforementioned conventional problems, it is therefore an object of the present invention to provide an information recording medium on which the display pattern can be displayed and various unique information about the display pattern can be recorded on the optical disc with a plurality of recording layers.

Means for Solving the Subject (Information Recording Medium)

Hereinafter, the information recording medium of the present invention will be discussed.

The above object of the present invention can be achieved by a first information recording medium provided with at least: a first recording layer (e.g., CD) irradiated by first laser light (e.g., red laser) with a first wavelength, in which a visually recognizable display pattern (e.g., image data: pit art) can be displayed and in which a first pit that allows information reading (which can hold various information in various methods) is formed; and a second recording layer (e.g., BD) irradiated by second laser light (blue) with a second wavelength, in which second information can be recorded by forming a second pit.

According to the first information recording medium of the present invention, in the first recording layer corresponding to the first laser light (e.g., red laser) with a first wavelength, the visually recognizable display pattern can be displayed by forming the first pit which can hold information. The "first pit" in the present invention is a pit which can display the visually recognizable display pattern and/or (ii) a pit which can hold unique information, such as copy control information for copyright protection about the display pattern, by the irradiation of the first laser light, such as visible light, infrared light, red LD (Laser Diode) light, or Blu-ray, in accordance with physical properties of the first laser light, such as a wavelength, or properties of laser light which complies with a CD (Compact Disc) method. On the other hand, in the second recording layer corresponding to the second laser light, the second information, such as DVD video contents, can be recorded by forming the second pit.

This allows the visually recognizable display pattern to be displayed and various information, such as encryption information for copyright protection, to be recorded on the information recording medium, such as a multilayer type optical disc provided with recording layers in each of which recording can be performed by using respective one of the plurality of laser lights with different wavelengths.

In one aspect of the first information recording medium of the in the present invention, first recording layer, the display pattern can be displayed by recording dummy data with no meaning along a spiral or concentric track (on which tracking servo is possible by obtaining a push-pull signal) and forming one portion of the first pit (e.g., dummy pit), and between the adjacent tracks, first information with a meaning can be recorded by forming another portion of the first pit (e.g., information pit).

According to this aspect, another portion of the first pit formed between the adjacent tracks allows more accurate recording of the first information with a meaning, such as encryption information for copyright protection. The "first information with a meaning" in the present invention is information with the unique content that can be identified, such as encryption information, at the time of recording or reproduction, in contrast to the dummy data for forming a recorded state, such as recording "Null" and "zero" and changing an optical property on the surface of the recording layer. Specifically, the first information may be, for example, CCI (Copy Control Information) for copyright protection of the display pattern or decryption information for decrypting the encrypted second information.

In another aspect of the first information recording medium of the in the present invention, in the first recording layer, the display pattern can be displayed by recording dummy data with no meaning along a spiral or concentric track (on which tracking servo is possible by obtaining a push-pull signal) and forming one portion of the first pit (e.g., dummy pit), and between the dummy data recorded along the track, first information with a meaning can be recorded by forming another portion of the first pit (e.g., information pit).

According to this aspect, another portion of the first pit formed between the dummy data, which is recorded along the track, allows more accurate recording of the first information with a meaning, such as encryption information for copyright protection.

In another aspect of the first information recording medium of the in the present invention, in the first recording layer, unique information based on watermark (e.g., CCI, an encryption/decryption key) can be superimposed on the display pattern by forming another portion of the first pit (e.g., information pit).

According to this aspect, another portion of the first pit formed allows recording of the unique information, such as encryption information for copyright protection. In addition, this can achieve strong copyright protection in the information recording medium.

In an aspect associated with the aforementioned first recording layer, it may be constructed such that in the first recording layer, the unique information can be superimposed because of a change in optical reflectance which indicates a ratio of reflecting the first laser light and which is based on a length of another portion of the first pit formed (e.g., information pit).

By virtue of such construction, it is possible to record the unique information, such as encryption information for copyright protection, by a change in the optical reflectance, which indicates a ratio of reflecting the first laser light and which is based on the length of another portion of the first pit formed.

Moreover, in an aspect associated with the aforementioned first recording layer, it may be constructed such that in the first recording layer, a reference line can be specified to detect a position of another portion of the first pit formed.

By virtue of such construction, it is possible to detect the position of another portion of the first pit formed (e.g., information pit), more appropriately, on the basis of the reference line specified by an information recording/reproducing apparatus or the like. Therefore, it is possible to read the information held by another portion of the first pit (e.g., information pit), more accurately and quickly.

Moreover, in an aspect associated with the aforementioned first recording layer, it may be constructed such that the first recording layer and the second recording layer are disc-shaped, and the reference line passes through the center of the disc.

By virtue of such construction, it is possible to specify the reference line, easily and quickly, in the middle of an operation of loading the disc-shaped information recording medium by an information recording/reproducing apparatus or the like.

The above object of the present invention can be also achieved by a second information recording medium provided with at least: a first recording layer (e.g., CD) corresponding to first laser light (e.g., visible light and infrared light) with a first wavelength, in which a visually recognizable display pattern (e.g., a barcode) can be displayed by forming a first pit with a changeable depth (or height); and a second recording layer (e.g., BD) corresponding to second laser light (e.g., blue laser) with a second wavelength, in which second information can be recorded by forming a second pit.

According to the second information recording medium of the present invention, it has substantially the same structure as that of the first information recording medium. In the second information recording medium, in particular, in the first recording layer, the visually recognizable display pattern can be displayed by forming the first pit with a changeable depth (or height) in association with the first laser light with the first wavelength.

This allows the visually recognizable display pattern to be displayed and various information, such as a barcode, to be identified on the information recording medium, such as a multilayer type optical disc provided with recording layers which can be irradiated with the laser light, such as visible light and infrared light.

In one aspect of the second information recording medium of the present invention, in the first recording layer, the display pattern can be displayed by forming (i) one pit with a depth (or height) of one kind of multiples (e.g., "½ times") of the first wavelength and (ii) another pit with a depth (height) of another kind of multiples (e.g., "¼ times") of the wavelength, as the first pit.

According to this aspect, it is possible to vary the displayable display pattern depending on each of the plurality of laser lights with different types of wavelengths, on the basis of (i) one pit with a depth (or height) of one kind of multiples (e.g., "½ times") of the first wavelength and (ii) another pit with a depth (or height) of another kind of multiples (e.g., "¼ times") of the wavelength, as the first pit.

In one aspect of the first or second information recording medium of the present invention, the second recording layer has a total reflective layer which reflects the entire second laser light.

According to this aspect, the display pattern (or pit art) can be displayed by using the first laser light irradiated from a side different from that of the second laser light.

In another aspect of the first or second information recording medium of the present invention, the second recording layer has a wavelength-selective layer with an optical reflectance, which indicates a ratio of reflecting the second laser light, different from an optical reflectance for the first laser light.

According to this aspect, the display pattern (or pit art) can be displayed by using the first laser light irradiated from the side as that of the second laser light.

In another aspect of the first or second information recording medium of the present invention, the second recording layer has at least a reflective layer which reflects the second laser light, and a thickness of the second recording layer can be changed.

According to this aspect, the display pattern (or pit art) can be more appropriately displayed by using the first laser light which has various optical properties determined by the thickness of the second recording layer.

In another aspect of the first or second information recording medium of the present invention, the second recording layer has a plurality of recording layers in each of which the second information can be recorded.

According to this aspect, it is possible to record the large and high-quality second information, such as DVD video contents, in the second recording layer.

In another aspect of the first or second information recording medium of the present invention, the second recording layer has a plurality of recording layers in each of which the second information can be recorded, and the plurality of recording layers are laminated or bonded.

According to this aspect, the display pattern (or pit art) can be more appropriately displayed by using the first laser light which has various optical properties determined by the properties of the second recording layer bonded.

In another aspect of the first or second information recording medium of the present invention, it is further provided with a dummy substrate with no recording layer.

According to this aspect, the display pattern (or pit art) can be more appropriately displayed by using the first laser light which has various optical properties determined by the properties of the dummy substrate.

These effects and other advantages of the present invention will become more apparent from the following embodiments.

As explained above, according to the information recording medium of the present invention, it is provided with the first recording layer with the first pit formed and the second recording layer with the second pit formed. This allows the visually recognizable display pattern to be displayed and various information, such as encryption information for copyright protection, to be identified on the information recording medium, such as a multilayer type optical disc provided with recording layers in each of which recording can be performed by using respective one of the plurality of laser lights with different wavelengths.

BRIEF DESCRIPTION OF DRAWINGS

FIG. 1 are a schematic plan view showing the basic structure of an optical disc 100 in a first embodiment of the information recording medium of the present invention (FIG. 1(a)), and a schematic cross sectional view showing the optical disc on a section "X" corresponding to the schematic plan view (FIG. 1(b)).

FIG. 2 is a schematic cross sectional view showing the optical disc which can display a pit art corresponding to FIG. 1(b).

FIG. 3 is a schematic plan view showing the optical disc which can display a pit art corresponding to FIG. 1(a).

FIG. 4 is a schematic plan view showing the optical disc which can display a pit art on which watermarking is performed in the first embodiment of the information recording medium of the present invention.

FIG. 5 are a plan view showing one example of the detailed physical structure of a first pit of the present invention (FIG. 5(a)), and a view showing a push-pull signal or the like read from the first pit of the present invention.

FIG. 6 is a plan view showing another example of the detailed physical structure of the first pit of the present invention.

FIG. 7 is a schematic plan view showing the optical disc which can display a pit art on which watermarking is performed in a first modified example of the first embodiment of the information recording medium of the present invention.

FIG. 8 are schematic plan views showing the optical disc which can display a pit art in a second modified example of the first embodiment of the information recording medium of the present invention with regard to visible light (or white light) (FIG. 8(a)) and infrared light (or light with a predetermined wavelength of "λ") (FIG. 8(b)).

FIG. 9 are schematic diagrams schematically showing the optical principle of the two types of first pits in the second modified example of the first embodiment of the information recording medium of the present invention.

FIG. 10 are schematic plan views showing the pit art in the second modified example of the first embodiment of the information recording medium of the present invention with regard to visible light (or white light) (FIG. 10(a)) and infrared light (or light with a predetermined wavelength of "λ") (FIG. 10(b)).

FIG. 11 are schematic plan views showing the optical disc which can display a pit art in a third modified example of the first embodiment of the information recording medium of the present invention with regard to visible light (or white light) (FIG. 11(a)) and infrared light (or light with a predetermined wavelength of "λ") (FIG. 11(b)).

FIG. 12 is a schematic cross sectional view showing an optical disc which can display the pit art in a second embodiment of the information recording medium of the present invention.

FIG. 13 is a graph showing an optical reflectance, which is a ratio of reflecting light with a wavelength as a parameter, in a wavelength-selective layer which constitutes the second embodiment of the information recording medium of the present invention.

FIG. 14 is a schematic cross sectional view showing an optical disc which can display the pit art in a third embodiment of the information recording medium of the present invention.

FIG. 15 is a schematic cross sectional view showing an optical disc which can display the pit art in a fourth embodiment of the information recording medium of the present invention.

FIG. 16 is a schematic cross sectional view showing an optical disc which can display the pit art in a fifth embodiment of the information recording medium of the present invention.

FIG. 17 is a schematic cross sectional view showing an optical disc which can display the pit art in a sixth embodiment of the information recording medium of the present invention.

DESCRIPTION OF REFERENCE CODES 10 center hole
100 optical disc
101 first recording layer
102 second recording layer

BEST MODE FOR CARRYING OUT THE INVENTION

Hereinafter, the best mode for carrying out the present invention will be discussed in order for each embodiment, with reference to the drawings.

(1) First Embodiment of Information Recording Medium

Firstly, with reference to FIG. 1 to FIG. 11, a first embodiment of the information recording medium of the present invention and its various modified examples will be discussed.

(1-1) Basic Structure

Firstly, with reference to FIG. 1 to FIG. 3, an explanation will be given on the outline of the basic structure of an optical disc in the first embodiment of the recording medium of the present invention. FIG. 1 are a schematic plan view showing the basic structure of an optical disc 100 in the first embodiment of the information recording medium of the present invention (FIG. 1(a)), and a schematic cross sectional view showing the optical disc on a section "X" corresponding to the schematic plan view (FIG. 1(b)). FIG. 2 is a schematic cross sectional view showing the optical disc which can display a pit art corresponding to FIG. 1(b). FIG. 3 is a schematic plan view showing the optical disc which can display a pit art corresponding to FIG. 1(a).

As shown in FIG. 1(a) and FIG. 1(b), the optical disc 100 has a disc shape with a diameter of about 12 cm, having a center hole 10, as is a DVD. This shape and size, however, are not limited to this example, and obviously various sizes and various shapes may be employed.

As shown in FIG. 1(b) and FIG. 2, the optical disc 100 is a multilayer type recording medium, such as a dual-layer type, on which a plurality of recording layers are laminated. The optical disc 100 is provided, as viewed from the irradiation side of first laser light for CD (i.e., the upper side in FIG. 1(b)), with: a polycarbonate layer; a first recording layer 101, such as a CD, with a total reflective layer (or a complete reflective layer) on the rear side viewed from the first laser light; an intermediate layer; a second recording layer 102, such as a Blu-ray Disc (BD), with a total reflective layer on the rear side viewed from second laser light; and a polycarbonate layer. Specifically, the first recording layer is a recording layer which has record sensitivity to be able to form a record mark by the first laser light. The first laser light in the embodiment is laser light, such as visible light, infrared light, and red LD (Laser Diode) light, which has a predetermined physical or optical property, such as one kind of wavelength.

The second recording layer is a recording layer which has the record sensitivity to be able to form a record mark by the second laser light. The second laser light in the embodiment is laser light with a relatively short wavelength, such as a Blu-ray with a wavelength of 405 nm.

The intermediate layer (i.e., total reflective layer) is a layer which has such a property that a reflectance with respect to the laser light with one kind of wavelength is relatively high and a reflectance with respect to the laser light with another kind of wavelength is also relatively high. Therefore, the first laser light for CD irradiated from the upper side in FIG. 1(b) cannot reach the second recording layer, so that it does not have an effect thereon. Similarly, the second laser light for BD irradiated from the lower side in FIG. 1(b) cannot reach the first recording layer, so that it does not have an effect thereon. Incidentally, the first laser light for displaying a display pattern is not necessarily the laser light that complies with a CD format. Thus, with regard to the display of the display pattern, there may be no intermediate layer provided.

Each of the polycarbonate layers may have a thickness of 0.6 mm, for example.

More specifically, as shown in FIG. 2 and FIG. 3, it is possible to visually recognize the display pattern (or pit art), such as "Pioneer", formed by a first pit corresponding to the first laser light by irradiating the first recording layer with the first laser light. Incidentally, the display pattern can be displayed by recording dummy data with no meaning, such as "Null", and forming one portion of the first pit, i.e. a dummy pit. On the other hand, in the second recording layer, second information, such as DVD video contents, can be recorded by forming a second pit with the second laser light irradiated, or the second information can be recorded along the recording tracks.

(1-2) Specific Structure of First Pit

Next, with reference to FIG. 4, an explanation will be given on the specific structure of the first pit which can display the display pattern (or pit art). FIG. 4 is a schematic plan view showing the optical disc which can display the pit art on which watermarking is performed in the first embodiment of the information recording medium of the present invention.

In particular, in the optical disc 100 in the embodiment, as shown in FIG. 4, unique information based on watermark is superimposed on the display pattern. Specifically, the unique information can be superimposed by forming another portion of the first pit corresponding to the first laser light, i.e. by forming an information pit. Incidentally, as a specific example of the unique information, there is listed copy control information for copyright protection about the display pattern, i.e. CCI (Copy Control Information) or the like.

(1-2-1) One Specific Example of Structure of First Pit

Now, with reference to FIG. 5, an explanation will be given on one example of the detailed physical structure of the first pit. FIG. 5 are a plan view showing one example of the detailed physical structure of the first pit of the present invention (FIG. 5(a)), and a view showing a push-pull signal or the like read from the first pit of the present invention.

As shown in FIG. 5(a), in order to display the display pattern, such as an image, the dummy data with no meaning is recorded along the spiral or concentric track in the first recording layer, to thereby form one portion of the first pit (or dummy pit). Then, between the adjacent tracks, the unique information can be recorded (or superimposed) by forming another portion of the first pit (or information pit).

Therefore, as shown in FIG. 5(b), a push-pull signal is read from one portion of the first pit (or dummy pit) formed along the track in the first recording layer, so that tracking servo is possible. At the same time, the unique information can be read from another portion of the first pit (or information pit)

formed along the track in the first recording layer. Specifically, as shown in an "A area" in FIG. 5(a) and FIG. 5(b), the unique information which holds e.g. "1 binary" may be read by using two information pits between which the dummy pit is sandwiched. Moreover, as shown in a "B area" in FIG. 5(a) and FIG. 5(b), the unique information which holds e.g. "0 binary" may be read by using one information pit located on one side of the dummy pit.

(1-2-2) Another Specific Example of Structure of First Pit

Now, with reference to FIG. 6, an explanation will be given on another example of the detailed physical structure of the first pit. FIG. 6 is a plan view showing another example of the detailed physical structure of the first pit of the present invention.

As shown in FIG. 6, in order to display the display pattern, such as an image, the dummy data with no meaning is recorded along the spiral or concentric track in the first recording layer, to thereby form one portion of the first pit (or dummy pit). Then, in an area adjacent to one dummy pit, there are formed, along the track in the first recording layer in a reading direction (refer to an arrow in FIG. 6): (i) a synchronization pit for synchronization when reading the information pit; (ii) another portion of the first pit (or information pit); and (iii) a DC correction pit for correcting a DC (Direct Current) component of a read reproduction RF signal. Therefore, the unique information can be recorded (or superimposed) through the information pit. Incidentally, between one dummy pit and another dummy pit, there may be formed, for example, a guide pit for reading the push-pull signal.

(1-3) First Modified Example

Next, with reference to FIG. 7, an explanation will be given on a first modified example of the structure of the first pit which can display the display pattern (or pit art). FIG. 7 is a schematic plan view showing the optical disc which can display the pit art on which watermarking is performed in the first modified example of the first embodiment of the information recording medium of the present invention.

In particular, in the optical disc 100 in the first modified example, as shown in FIG. 7, a reference line, i.e. a line segment connecting a "point a" and a "point b", can be specified to detect a position of another portion of the first pit formed (or information pit). The reference line is formed to superimpose the unique information based on watermark on the display pattern. Then, it is possible to determine the position of the information pit, uniquely or unambiguously, by the following one example of a geometric procedure, and it is possible to read the unique information from the determined position.

(i) Specify the reference line (i.e., the line segment connecting the "point a" and the "point b").

(ii) Specify a "point c" located on the leftmost side and on the lowest side of the display pattern (or pit art).

(iii) Consider a line which is parallel to the specified reference line and which passes through the specified "point c" to be an "x axis".

(iv) Consider a line which is perpendicular to the specified reference line and which passes through the specified "point c" to be a "y axis".

(v) Determine a position of e.g. "x=40 (mm)" and "y=20 (mm)" on the coordinates of the "x axis" and the "y axis" defined in the above procedure.

(vi) Read the unique information from the determined position.

In particular, the reference line (i.e., the line segment connecting the "point a" and the "point b") may pass through the center of the center hole 10 of the disc-shaped optical disc. As a result, it is possible to specify the reference line, easily and quickly, in the middle of an operation of loading the optical disc 100. Moreover, the reference line may be a line segment connecting an innermost point of the display pattern and an outermost point. Alternatively, the reference line may be a line segment connecting one point located on the inner circumference of the display pattern and another point located on the inner circumference. Alternatively, the reference line may be a line segment connecting one point located on the leftmost side of the display pattern and another point located on the rightmost side.

(1-4) Second Modified Example

Next, with reference to FIG. 8 to FIG. 10, an explanation will be given on a second modified example of the structure of the first pit which can display the display pattern (or pit art). FIG. 8 are schematic plan views showing the optical disc which can display the pit art in the second modified example of the first embodiment of the information recording medium of the present invention with regard to visible light (or white light) (FIG. 8(a)) and infrared light (or light with a predetermined wavelength of "λ") (FIG. 8(b)).

In the second modified example of the first pit, the first pit may be formed of pits in two types of physical structures. That is, as shown in FIG. 8, the first pit may be formed, for example, of (i) a type with a depth of "¼ times" of the wavelength "λ" of infrared light and (ii) a type with a depth of "½ times" of the wavelength "λ" of the infrared light.

As a result, as shown in FIG. 8(a), with respect to visible light (or white light), one kind of display pattern (or pit art) can be displayed. On the other hand, as shown in FIG. 8(b), with respect to infrared light with a predetermined wavelength of e.g. "λ", another kind of display pattern (or pit art) can be displayed because there is a difference in brightness contrast between the first pit with the depth of "¼λ" and the first pit with the depth of "½λ".

Now, with reference to FIG. 9 and FIG. 10, the optical principle of the second modified example will be explained with the specific example of the second modified example. FIG. 9 are schematic diagrams schematically showing the optical principle of the two types of first pits in the second modified example of the first embodiment of the information recording medium of the present invention. FIG. 10 are schematic plan views showing the pit art in the second modified example of the first embodiment of the information recording medium of the present invention with regard to visible light (or white light) (FIG. 10(a)) and infrared light (or light with a predetermined wavelength of "λ") (FIG. 10(b)).

As shown in FIG. 9(a), if the infrared light (with the wavelength of "λ") enters the first pit with the depth of "¼ times" of the wavelength "λ", (i) reflected light reflected on a fixed edge in the first pit (with the depth of "¼λ") and (ii) reflected light reflected on a fixed edge in an area in which the first pit is not formed have opposite phases. Therefore, the two reflected lights cancel each other, and the brightness contrast becomes minimum between the area in which the first pit (with the depth of "¼λ") is formed and the area in which the first pit is not formed. Thus, the display pattern formed by the first pit (with the depth of "¼λ") can be hardly visually recognized or cannot be visually recognized at all.

On the other hand, as shown in FIG. 9(b), if the infrared light (with the wavelength of "λ") enters the first pit with the depth of "½ times" of the wavelength "λ", (i) reflected light reflected on the fixed edge in the first pit (with the depth of "½λ") and (ii) reflected light reflected on the fixed edge in the area in which the first pit is not formed have the same phase. That is, the reflected light reflected on the fixed edge in the first pit (with the depth of "½λ") is substantially the same as the light reflected on a mirror. Therefore, the brightness contrast becomes maximum between the area in which the first pit (with the depth of "½λ") is formed and the area in which the first pit is not formed. Thus the display pattern formed by the first pit (with the depth of "½λ") can be displayed.

As a result, as shown in FIG. 10(a), with respect to visible light (or white light), one kind of display pattern (or pit art) can be displayed because there is no difference in the brightness contrast between the first pit with the depth of "¼λ" and the first pit with the depth of "½λ". That is, "a face without a wink" and "a thick barcode" can be displayed. On the other hand, as shown in FIG. 10(b), with respect to infrared light with a predetermined wavelength of e.g. "λ", another kind of display pattern (or pit art) can be displayed because there is a difference in the brightness contrast between the first pit with the depth of "¼λ" and the first pit with the depth of "½λ". That is, "a face with a wink" and "a thin barcode" can be displayed.

(1-5) Third Modified Example

Next, with reference to FIG. 11, an explanation will be given on a third modified example of the structure of the first pit which can display the display pattern (or pit art). FIG. 11 are schematic plan views showing the optical disc which can display the pit art in the third modified example of the first embodiment of the information recording medium of the present invention with regard to visible light (or white light) (FIG. 11(a)) and infrared light (or light with a predetermined wavelength of "λ") (FIG. 11(b)).

In the third modified example, the first pit may be formed of pits in two types of physical structures. That is, as shown in FIG. 11, the first pit may be formed, for example, of (i) a relatively short type and (b) a relatively long type.

As a result, as shown in FIG. 11(a), with respect to visible light (or white light), one kind of display pattern (or pit art) can be displayed because there is no difference in the brightness contrast between the relatively short first pit and the relatively long first pit. That is, "a face without a wink" and "a thick barcode" can be displayed. On the other hand, as shown in FIG. 11(b), with respect to infrared light with a predetermined wavelength of e.g. "λ", another kind of display pattern (or pit art) can be displayed because there is a difference in the brightness contrast between the relatively short first pit and the relatively long first pit. That is, "a face with a wink" and "a thin barcode" can be displayed.

(2) Second Embodiment of Information Recording Medium

Next, a second embodiment of the information recording medium of the present invention will be discussed.

(2-1) Detailed Structure

With reference to FIG. 12, an explanation will be given on the outline of the basic structure of an optical disc in the second embodiment of the recording medium of the present invention. FIG. 12 is a schematic cross sectional view showing an optical disc which can display the pit art in the second embodiment of the information recording medium of the present invention. FIG. 13 is a graph showing an optical reflectance, which is a ratio of reflecting light with a wavelength as a parameter, in a wavelength-selective layer which constitutes the second embodiment of the information recording medium of the present invention. Incidentally, the vertical axis in FIG. 13 indicates the optical reflectance, and the horizontal axis indicates the wavelength. Moreover, in the second embodiment, an explanation will be omitted on the same structure as in the first embodiment, as occasion demands.

In the second embodiment, the first recording layer 101 is provided with a total reflective layer on the rear side of the signal surface, i.e. on the rear side viewed in the irradiation direction of the first and second laser light. The second recording layer 102 is provided with a wavelength-selective film, a semi-transmissive reflective film, or a semi-transmissive film with wave selectivity, on the rear side of the signal surface, i.e. on the rear side viewed in the irradiation direction of the first and second laser light. For example, the semi-transmissive film with wave selectivity has such a property that a reflectance with respect to laser light with one kind of wavelength is relatively high and a reflectance with respect to laser light with another kind of wavelength is relatively low; namely, wave selectivity. Specifically, as shown in a "point B" in FIG. 13, the optical reflectance with respect to the second laser light with a relatively small wavelength in the wavelength-selective layer is set to be relatively large. Therefore, the wavelength-selective layer reflects the second laser light, so that the second laser light cannot reach the first recording layer.

This allows the display pattern (or pit art) to be displayed by using the first laser light irradiated from the same side as that of the second laser light. Moreover, if the first recording layer is irradiated with the second laser light, such as a Blue ray, the second laser light hardly passes through or does not pass through the wavelength-selective layer, so that it is possible to further reduce an influence to the first recording layer, i.e. an interlayer interference.

(3) Third Embodiment of Information Recording Medium

Next, a third embodiment of the information recording medium of the present invention will be discussed.

(3-1) Detailed Structure

With reference to FIG. 14, an explanation will be given on the outline of the basic structure of an optical disc in the third embodiment of the recording medium of the present invention. FIG. 14 is a schematic cross sectional view showing an optical disc which can display the pit art in the third embodiment of the information recording medium of the present invention. Moreover, in the third embodiment, an explanation will be omitted on the same structure as in the first embodiment as occasion demands.

In the third embodiment, the first recording layer 101 is provided with a total reflective layer on the rear side of the signal surface, i.e. on the rear side viewed in the irradiation direction of the first laser light. On the other hand, the second recording layer 102 is provided with: (i) a semi-transmissive film on the rear side of one signal surface, out of two, located on the front side viewed in the irradiation side of the second laser light; and (ii) a total reflective film on the rear side of the other signal surface located on the rear side viewed in the irradiation side of the second laser light.

This allows the large and high-quality second information, such as DVD video contents, to be recorded in the second recording layer of the optical disc which can display the display pattern (or pit art), with the unique information held.

(4) Fourth Embodiment of Information Recording Medium

Next, a fourth embodiment of the information recording medium of the present invention will be discussed.

(4-1) Detailed Structure

With reference to FIG. 15, an explanation will be given on the outline of the basic structure of an optical disc in the fourth embodiment of the recording medium of the present invention. FIG. 15 is a schematic cross sectional view showing an optical disc which can display the pit art in the fourth embodiment of the information recording medium of the present invention. Moreover, in the fourth embodiment, an explanation will be omitted on the same structure as in the second embodiment as occasion demands.

In the fourth embodiment, the first recording layer 101 is provided with a total reflective layer on the rear side of the signal surface, i.e. on the rear side viewed in the irradiation direction of the first and second laser light. On the other hand, the second recording layer 102 is provided with: (i) a wavelength-selective film, a semi-transmissive film, or a semi-transmissive film with wavelength selectivity, on the rear side of one signal surface, out of two, located on the front side viewed in the irradiation side of the second laser light; and (ii) a wavelength-selective film, a semi-transmissive film, or a semi-transmissive film with wavelength selectivity, on the rear side of the other signal surface located on the rear side viewed in the irradiation side of the second laser light.

This allows (i) the display pattern (or pit art) to be displayed by using the first laser light irradiated from the same side as that of the second laser light and (ii) the large and high-quality second information, such as DVD video contents, to be recorded in the second recording layer of the optical disc.

(5) Fifth Embodiment of Information Recording Medium

Next, a fifth embodiment of the information recording medium of the present invention will be discussed.

(5-1) Detailed Structure

With reference to FIG. 16, an explanation will be given on the outline of the basic structure of an optical disc in the fifth embodiment of the recording medium of the present invention. FIG. 16 is a schematic cross sectional view showing an optical disc which can display the pit art in the fifth embodiment of the information recording medium of the present invention. Moreover, in the fifth embodiment, an explanation will be omitted on the same structure as in the first embodiment as occasion demands.

In the fifth embodiment, (i) a dummy substrate may be provided on the side of the second recording layer 102, and (ii) the second recording layer 102 may be provided with a plurality of recording layers. In particular, in the fifth embodiment, the first recording layer 101 is provided with a total reflective layer on the rear side of the signal surface, i.e. on the rear side viewed in the irradiation direction of the first and second laser light. On the other hand, the second recording layer 102 is provided with (i) a wavelength-selective film, a semi-transmissive film, or a semi-transmissive film with wavelength selectivity, on the rear side of one signal surface, out of two, located on the front side viewed in the irradiation side of the second laser light. Similarly it is provided with (ii) a wavelength-selective film, a semi-transmissive film, or a semi-transmissive film with wavelength selectivity, on the rear side of the other signal surface located on the rear side viewed in the irradiation side of the second laser light.

This allows (i) the display pattern (or pit art) to be displayed by using the first laser light which is irradiated from the same side as that of the second laser light and which has various optical properties determined from the properties of the dummy substrate. In addition, this allows the large and high-quality second information, such as DVD video contents, to be recorded in the second recording layer of the optical disc.

(6) Sixth Embodiment of Information Recording Medium

Next, a sixth embodiment of the information recording medium of the present invention will be discussed.

(6-1) Detailed Structure

With reference to FIG. 17, an explanation will be given on the outline of the basic structure of an optical disc in the sixth embodiment of the recording medium of the present invention. FIG. 17 is a schematic cross sectional view showing an optical disc which can display the pit art in the sixth embodiment of the information recording medium of the present invention. Moreover, in the sixth embodiment, an explanation will be omitted on the same structure as in the first embodiment as occasion demands.

In the sixth embodiment, the second recording layer 102 may be formed by pasting or bonding a plurality of recording layers. In particular, in the sixth embodiment, the first recording layer 101 is provided with a total reflective layer on the rear side of the signal surface, i.e. on the rear side viewed in the irradiation direction of the first and second laser light. On the other hand, the second recording layer 102 is provided with (i) a wavelength-selective film, a semi-transmissive film, or a semi-transmissive film with wavelength selectivity, on the rear side of one signal surface, out of two, located on the front side viewed in the irradiation side of the second laser light. Similarly it is provided with (ii) a wavelength-selective film, a semi-transmissive film, or a semi-transmissive film with wavelength selectivity, on the rear side of the other signal surface located on the rear side viewed in the irradiation side of the second laser light.

This allows (i) the display pattern (or pit art) to be displayed by using the first laser light which is irradiated from the same side as that of the second laser light and which has various optical properties determined from the properties of the bonded second recording layer. In addition, this allows the large and high-quality second information, such as DVD video contents, to be recorded in the second recording layer of the optical disc.

Moreover, in the aforementioned embodiments, the read-only recording layer, such as a Blu-ray disk (BD)-ROM, is applied as one specific example of the second recording layer. The present invention, however, can be applied to a recordable or write-once type recording layer, such as a BD-R, or to a rewritable type recording layer, such as a BD-RW.

Moreover, in the aforementioned embodiments, the optical disc 100 is explained as one example of the information recording medium. The present invention, however, is not limited to the optical disc but can be also applied to other various information recording media supporting high-density recording or high transmission rates, such as a DVD and a HD-DVD (High Density DVD).

The present invention is not limited to the aforementioned embodiments, and various changes may be made, if desired, without departing from the essence or spirit of the invention which can be read from the claims and the entire specification. An information recording medium, which involves such changes, is also intended to be within the technical scope of the present invention.

INDUSTRIAL APPLICABILITY

The information recording medium according to the present invention can be applied to a multilayer type optical disc, such as a dual-layer type optical disc.

The invention claimed is:

1. An information recording medium comprising at least:
a first recording layer irradiated by first laser light with a first wavelength, in which a first pit that allows information reading is formed; and
a second recording layer irradiated by second laser light with a second wavelength, in which second information can be recorded by forming a second pit,
wherein in said first recording layer, a visually recognizable display pattern can be displayed by forming one portion of the first pit, and
wherein in said first recording layer, unique information based on watermark can be superimposed on the display pattern by forming another portion of the first pit.

2. The information recording medium according to claim 1, wherein in said first recording layer, the unique information can be superimposed because of a change in optical reflectance which indicates a ratio of reflecting the first laser light and which is based on a length of another portion of the first pit formed.

3. The information recording medium according to claim 1, wherein in said first recording layer, a reference line can be specified to detect a position of another portion of the first pit formed.

4. The information recording medium according to claim 3, wherein said first recording layer and said second recording layer are disc-shaped, and the reference line passes through the center of the disc.

5. An information recording medium comprising at least:
a first recording layer in which a visually recognizable display pattern can be displayed by forming a first pit, a depth of said first pit being changeable in accordance with a first laser light with a first wavelength; and
a second recording layer in which second information can be recorded by forming a second pit in accordance with a second laser light with a second wavelength,
wherein in said first recording layer, the display pattern can be displayed by forming (i) one pit with a depth of one kind of multiples of the first wavelength and (ii) another pit with a depth of another kind of multiples of the wavelength, as the first pit.

6. An information recording medium comprising at least:
a first recording layer irradiated by first laser light with a first wavelength, in which a first pit that allows information reading is formed; and
a second recording layer irradiated by second laser light with a second wavelength, in which second information can be recorded by forming a second pit,
wherein in said first recording layer, a visually recognizable display pattern can be displayed by forming one portion of the first pit, and
wherein said second recording layer has a wavelength-selective layer with an optical reflectance, which indicates a ratio of reflecting the second laser light, different from an optical reflectance for the first laser light.

7. An information recording medium comprising at least:
a first recording layer in which a visually recognizable display pattern can be displayed by forming a first pit, a depth of said first pit being changeable in accordance with a first laser light with a first wavelength; and
a second recording layer in which second information can be recorded by forming a second pit in accordance with a second laser light with a second wavelength,
wherein said second recording layer has a wavelength-selective layer with an optical reflectance, which indicates a ratio of reflecting the second laser light, different from an optical reflectance for the first laser light.

8. An information recording medium comprising at least:
a first recording layer irradiated by first laser light with a first wavelength, in which a first pit that allows information reading is formed; and
a second recording layer irradiated by second laser light with a second wavelength, in which second information can be recorded by forming a second pit,
wherein in said first recording layer, a visually recognizable display pattern can be displayed by forming one portion of the first pit, and
wherein said second recording layer has a plurality of recording layers in each of which the second information can be recorded.

9. An information recording medium comprising at least:
a first recording layer in which a visually recognizable display pattern can be displayed by forming a first pit, a depth of said first pit being changeable in accordance with a first laser light with a first wavelength; and
a second recording layer in which second information can be recorded by forming a second pit in accordance with a second laser light with a second wavelength,
wherein said second recording layer has a plurality of recording layers in each of which the second information can be recorded.

10. An information recording medium comprising at least:
a first recording layer irradiated by first laser light with a first wavelength, in which a first pit that allows information reading is formed; and
a second recording layer irradiated by second laser light with a second wavelength, in which second information can be recorded by forming a second pit,
wherein in said first recording layer, a visually recognizable display pattern can be displayed by forming one portion of the first pit, and
wherein said second recording layer has a plurality of recording layers in each of which the second information can be recorded, and the plurality of recording layers are laminated or bonded.

11. An information recording medium comprising at least:
a first recording layer in which a visually recognizable display pattern can be displayed by forming a first pit, a depth of said first pit being changeable in accordance with a first laser light with a first wavelength; and
a second recording layer in which second information can be recorded by forming a second pit in accordance with a second laser light with a second wavelength,
wherein said second recording layer has a plurality of recording layers in each of which the second information can be recorded, and the plurality of recording layers are laminated or bonded.

12. An information recording medium comprising at least:
a first recording layer irradiated by first laser light with a first wavelength, in which a first pit that allows information reading is formed;
a second recording layer irradiated by second laser light with a second wavelength, in which second information can be recorded by forming a second pit; and
a dummy substrate with no recording layer,
wherein in said first recording layer, a visually recognizable display pattern can be displayed by forming one portion of the first pit.

13. An information recording medium comprising at least:
a first recording layer in which a visually recognizable display pattern can be displayed by forming a first pit, a depth of said first pit being changeable in accordance with a first laser light with a first wavelength;
a second recording layer in which second information can be recorded by forming a second pit in accordance with a second laser light with a second wavelength; and
a dummy substrate with no recording layer.

* * * * *